US012340733B2

(12) United States Patent
Cho et al.

(10) Patent No.: US 12,340,733 B2
(45) Date of Patent: Jun. 24, 2025

(54) DRIVE CONTROLLER, DISPLAY DEVICE, AND METHOD FOR DRIVING DISPLAY DEVICE

(71) Applicant: Samsung Display Co., Ltd., Yongin-si (KR)

(72) Inventors: Seongheon Cho, Yongin-si (KR); Kuk-Hwan Ahn, Yongin-si (KR); Seungjae Lee, Yongin-si (KR); Dae-Gwang Jang, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/527,090

(22) Filed: Dec. 1, 2023

(65) Prior Publication Data

US 2024/0265852 A1 Aug. 8, 2024

(30) Foreign Application Priority Data

Feb. 8, 2023 (KR) ........................ 10-2023-0016808

(51) Int. Cl.
*G09G 3/32* (2016.01)

(52) U.S. Cl.
CPC ....... *G09G 3/32* (2013.01); *G09G 2320/0233* (2013.01); *G09G 2320/0285* (2013.01); *G09G 2320/041* (2013.01)

(58) Field of Classification Search
CPC ............. G09G 3/32; G09G 2320/0233; G09G 2320/0285; G09G 2320/041; G09G 3/20; G09G 3/2074; G09G 3/30; G09G 3/3208; G09G 2320/02; G09G 2320/043; G09G 2330/045
See application file for complete search history.

(56) References Cited

U.S. PATENT DOCUMENTS 6,061,043 A * 5/2000 Bonnett ............ G02F 1/133528 345/694
7,638,754 B2 * 12/2009 Morimoto .............. H05B 45/46 250/206
10,096,300 B2 * 10/2018 Cheon ...................... G09G 5/10
(Continued)

FOREIGN PATENT DOCUMENTS

KR 10-2017-0097253 A 8/2017
KR 10-2034062 B1 10/2019
KR 10-2078093 B1 2/2020

*Primary Examiner* — Benyam Ketema
(74) *Attorney, Agent, or Firm* — Womble Bond Dickinson (US) LLP

(57) ABSTRACT

A display device includes: a display panel displaying an image; and a drive controller receiving an image signal, and driving the plurality of pixels, and including a heat emitting controller, wherein the heat emitting controller includes: an average region setter receiving the image signal, setting, to one pixel region, some pixels of the plurality of pixels, and extracting an average gray level, based on gray levels of the some pixels of the plurality of pixels to set an average region from the pixel region; a diffusion region setter substituting a diffusion region, which is set to have a temperature corresponding to the average gray level, into the average region; and a look-up table map generator generating a look-up table map by predicting, based on the diffusion region, heat emitted from an inner part of a display region of the display panel and varied depending on the image.

20 Claims, 11 Drawing Sheets

(56) References Cited

U.S. PATENT DOCUMENTS 10,371,584 B2 8/2019 Kim et al.
10,580,358 B2 * 3/2020 Kuki .................... G09G 3/2007
10,943,541 B1 * 3/2021 Tan .......................... G09G 3/32
11,217,142 B1 * 1/2022 Buckley .................... G06T 5/10
11,790,843 B2 * 10/2023 Zen ...................... G09G 3/2096 345/690
11,874,997 B2 * 1/2024 Mayumi ................ G09G 3/006
2005/0007392 A1 * 1/2005 Kasai ................... G09G 3/3275 345/690
2010/0007656 A1 * 1/2010 Okamoto ............. G09G 3/3233 345/76
2012/0287147 A1 * 11/2012 Brown Elliott .......... G09G 5/02 345/593
2016/0005342 A1 * 1/2016 Park ..................... G09G 3/3208 345/82
2017/0011692 A1 * 1/2017 Lee ...................... G09G 3/3233
2017/0053587 A1 * 2/2017 Kim ..................... G09G 3/2092
2017/0162226 A1 * 6/2017 Yamanaka ............... G09G 5/00
2017/0236490 A1 * 8/2017 Cheon ...................... G09G 5/10 345/691
2019/0362671 A1 * 11/2019 Kuki .................... G09G 3/2007
2020/0193904 A1 * 6/2020 Kho ..................... G09G 3/3233
2020/0372860 A1 * 11/2020 Kim ..................... G09G 3/3233
2020/0410958 A1 * 12/2020 Liang ..................... G03B 21/16
2022/0037447 A1 * 2/2022 Cho ....................... H10K 59/88
2022/0208065 A1 * 6/2022 Kubo ................... G09G 3/2003
2023/0043004 A1 * 2/2023 Kwon ...................... G09G 3/32
2023/0126636 A1 * 4/2023 Jeong ................... G09G 3/2092 345/55
2023/0162670 A1 * 5/2023 Bang .................... G09G 3/3225 345/204
2023/0186826 A1 * 6/2023 Hong ....................... G01K 7/16 345/214
2024/0005850 A1 * 1/2024 Jang ......................... G09G 3/32
2024/0105134 A1 * 3/2024 Jang ..................... G09G 3/3291
2024/0169895 A1 * 5/2024 Ahn ...................... G06F 3/0679
2024/0203313 A1 * 6/2024 Lee .......................... G09G 5/10
2024/0249664 A1 * 7/2024 Wang ..................... G09G 3/006

* cited by examiner

| | | | | | | | | | |
|---|---|---|---|---|---|---|---|---|---|
| 190 | 73 | 112 | 213 | 2 | 100 | 157 | 131 | 246 | 238 |
| 235 | 106 | 244 | 149 | 111 | 71 | 76 | 123 | 152 | 236 |
| 168 | 113 | 245 | 89 | 107 | 236 | 108 | 248 | 212 | 163 |
| 151 | 236 | 179 | 150 | 98 | 208 | 179 | 60 | 32 | 175 |
| 29 | 242 | 176 | 9 | 144 | 240 | 204 | 23 | 151 | 88 |
| 249 | 106 | 122 | 204 | 84 | 252 | 48 | 251 | 32 | 29 |
| 248 | 206 | 47 | 69 | 195 | 224 | 187 | 104 | 243 | 9 |
| 158 | 130 | 109 | 145 | 22 | 143 | 93 | 88 | 123 | 161 |
| 192 | 237 | 241 | 119 | 154 | 22 | 121 | 115 | 96 | 177 |
| 32 | 160 | 49 | 113 | 181 | 154 | 219 | 230 | 104 | 184 |

DRIVE CONTROLLER, DISPLAY DEVICE, AND METHOD FOR DRIVING DISPLAY DEVICE

CROSS-REFERENCE TO RELATED APPLICATIONS

The present application claims priority to and the benefit of Korean Patent Application No. 10-2023-0016808 filed on Feb. 8, 2023, in the Korean Intellectual Property Office, the entire disclosure of which is incorporated herein by reference.

BACKGROUND

1. Field

Aspects of some embodiments of the present disclosure described herein relate to a drive controller, a display device, and a method for driving display device, capable of predicting a heat emitting characteristic.

2. Description of Related Art

A display device generally includes a plurality of pixels and a driving circuit (e.g., a scan driving circuit and a data driving circuit) to control the plurality of pixels. Each of the plurality of pixels includes a display element and a driving circuit of a pixel, which controls the display element. The driving circuit of the pixel may include a plurality of transistors systematically connected to each other.

The scan driving circuit and/or the data driving circuit may be formed through the same process as a process for the plurality of pixels. The scan driving circuit and/or the data driving circuit may include a plurality of transistors systematically connected to each other.

The above information disclosed in this Background section is only for enhancement of understanding of the background and therefore the information discussed in this Background section does not necessarily constitute prior art.

SUMMARY

Aspects of some embodiments of the present disclosure include a drive controller, a display device, and a method for driving a display device. The drive controller and/or the display device may be capable of predicting a heat emitting characteristic.

According to some embodiments of the present disclosure, a display device may include a display panel including a plurality of pixels and to display an image, and a drive controller to receive an image signal, and to drive the plurality of pixels, and including a heat emitting control unit, and the heat emitting control unit may include an average region setting unit to receive the image signal, set, to one pixel region, some pixels of the plurality of pixels, and extract an average gray level, based on gray levels of the some pixels of the plurality of pixels to set an average region from the pixel region, a diffusion region setting unit to substitute a diffusion region set to have a temperature corresponding to the average gray level into the average region; and a look-up table map generating unit to generate a look-up table map by predicting, based on the diffusion region, heat emitted from an inner part of a display region of the display panel and varied depending on the image.

According to some embodiments, the average gray level may be an average value of the gray levels of the some pixels of the plurality of pixels.

According to some embodiments, the pixel region may have a shape of a square having N pixels (N is a natural number) in a first direction and a second direction crossing the first direction.

According to some embodiments, the diffusion region may be larger in size than the average region.

According to some embodiments, the diffusion region setting unit may set a region, which is at the center of the diffusion region, to be overlapped with the average region.

According to some embodiments, the diffusion region may be set to have a value lowered farther away from a central region.

According to some embodiments, the average region may include a plurality of average regions, and the average region setting unit may convert the image into the plurality of average regions and provides a conversion result to the diffusion region setting unit.

According to some embodiments, the diffusion region may include a plurality of diffusion regions, and the plurality of diffusion regions may be applied to the plurality of average regions, respectively.

According to some embodiments, the look-up table map may have a temperature value corresponding to each of the plurality of average regions, and the look-up table map generating unit may store the temperature value by adding values of regions, which are overlapped with each other, of diffusion regions applied to average regions, which are adjacent to each other, of the plurality of average regions.

According to some embodiments of the present disclosure, a drive controller for driving a plurality of pixels, may include a heat emitting control unit, and the heat emitting control unit may include an average region setting unit to receive an image signal, set, to one pixel region, some pixels of the plurality of pixels, and extract an average gray level, based on gray levels of the some pixels of the plurality of pixels to set an average region from the pixel region, a diffusion region setting unit to substitute a diffusion region set to have a temperature corresponding to the average gray level into the average region; and a look-up table map generating unit to generate a look-up table map by predicting heat which is emitted from each of the plurality of pixels and varied depending on the image signal.

According to some embodiments, the average region may include a plurality of average regions, and the average region setting unit may convert the image into the plurality of average regions and provide a conversion result to the diffusion region setting unit.

According to some embodiments, the diffusion region may include a plurality of diffusion regions, and the plurality of diffusion regions may be applied to the plurality of average regions, respectively.

According to some embodiments, the look-up table map may have a temperature value corresponding to each of the plurality of average regions, and the look-up table map generating unit may store the temperature value by adding values of regions, which are overlapped with each other, of diffusion regions applied to average regions, which are adjacent to each other, of the plurality of average regions.

According to some embodiments, the average gray level may be an average value of the gray levels of the some pixels of the plurality of pixels.

According to some embodiments of the present disclosure, a method for driving a display device, may include providing an image signal to a drive controller to drive a display panel including a plurality of pixels, setting, to one pixel region, some pixels of the plurality of pixels, extracting an average gray level, based on gray levels of the some pixels of the plurality of pixels to set an average region from the pixel region, substituting a diffusion region set to have a temperature corresponding to the average gray level into the average region, and generating a look-up table map by predicting heat which is emitted from each of the plurality of pixels and varied depending on the image signal.

According to some embodiments, the plurality of pixels may display an image based on the image signal, the average region may include a plurality of average regions, and the setting of the average region may include converting the image into the plurality of average regions.

According to some embodiments, the diffusion region may include a plurality of diffusion regions, and the substituting of the diffusion region into the average region may include applying the plurality of diffusion regions to the plurality of average regions, respectively.

According to some embodiments, the look-up table map may have a temperature value corresponding to each of the plurality of average regions, and the generating of the look-up table map may include storing the temperature value by adding values of regions, which are overlapped with each other, of diffusion regions applied to average regions, which are adjacent to each other, of the plurality of average regions.

According to some embodiments, the method may further include compensating for each of the plurality of pixels, after generating the look-up table map.

According to some embodiments, the compensating for each of the plurality of pixels may include compensating for each of the plurality of pixels by using the look-up table map.

BRIEF DESCRIPTION OF THE FIGURES

The above and other characteristics and features of some embodiments of the present disclosure will become more apparent by describing in more detail aspects of some embodiments thereof with reference to the accompanying drawings.

DETAILED DESCRIPTION

Figure 1:
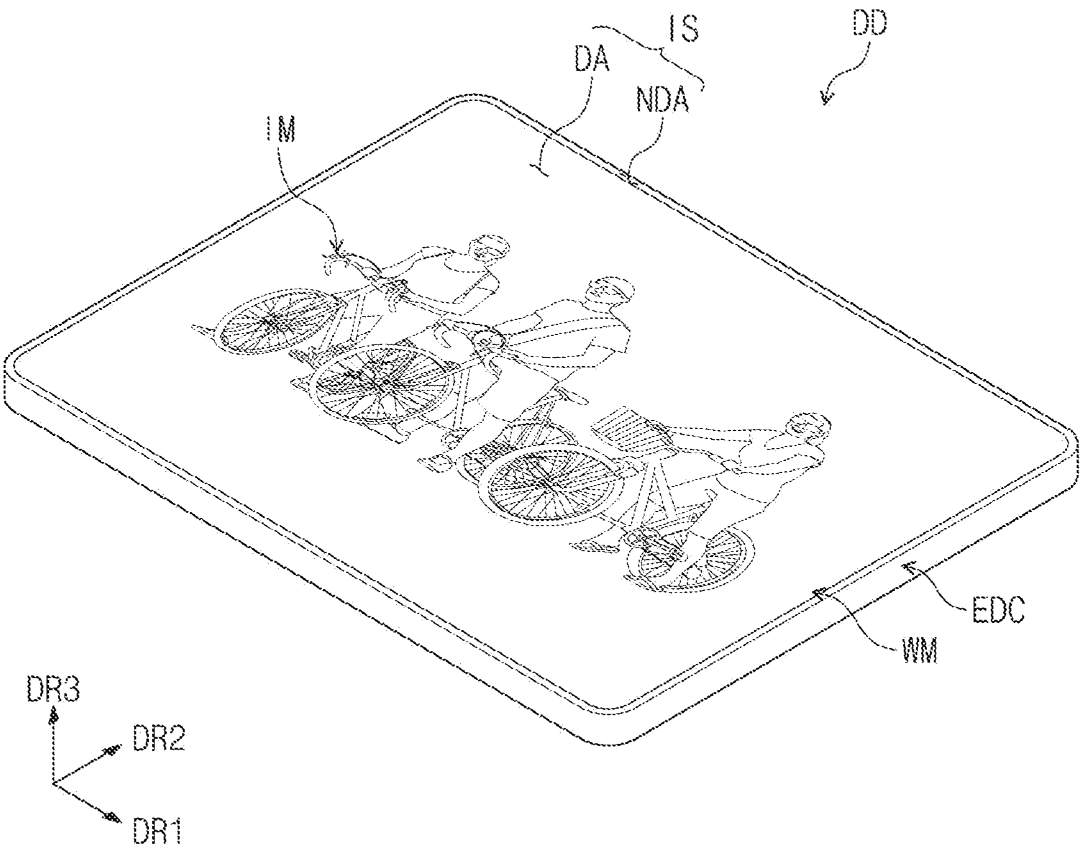
FIG. 1 is a perspective view of a display device according to some embodiments of the present disclosure.

In the specification, the expression that a first component (or region, layer, part, portion, etc.) is "on", "connected with", or "coupled to" a second component means that the first component is directly on, connected with, or coupled to the second component or means that a third component is located therebetween.

The same reference numeral refers to the same component. In addition, in drawings, thicknesses, proportions, and dimensions of components may be exaggerated to describe the technical features effectively. The expression "and/or" includes one or more combinations which associated components are capable of defining.

Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The articles "a," "an," and "the" are singular in that they have a single referent, but the use of the singular form in the specification should not preclude the presence of more than one referent.

In addition, the terms "under", "below", "on", "above", etc. are used to describe the correlation of components illustrated in drawings. The terms that are relative in concept are described based on a direction shown in drawings.

It will be understood that the terms "include", "comprise", "have", etc. specify the presence of features, numbers, steps, operations, elements, or components, described in the specification, or a combination thereof, not precluding the presence or additional possibility of one or more other features, numbers, steps, operations, elements, or components or a combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

Hereinafter, aspects of some embodiments of the present disclosure will be described in more detail with reference to the accompanying drawings.

Figure 2:
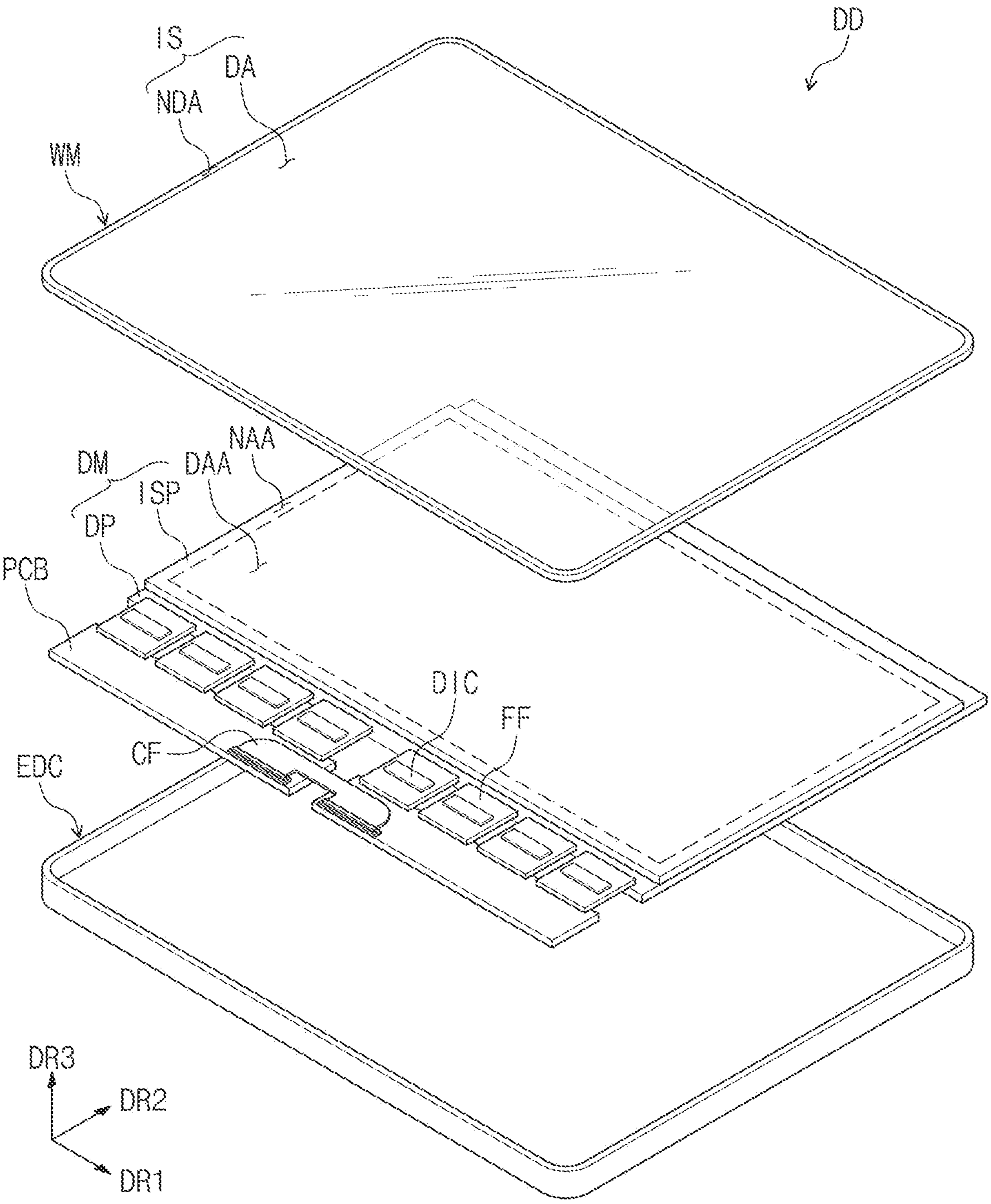
FIG. 2 is an exploded perspective view of a display device according to some embodiments of the present disclosure.

FIG. 1 is a perspective view of a display device, according to some embodiments of the present disclosure, and FIG. 2 is an exploded perspective view of a display device, according to some embodiments of the present disclosure.

Referring to FIGS. 1 and 2, a display device DD may be a device activated depending on an electrical signal. According to some embodiments of the present disclosure, the display device DD may include a large-size display device, such as a television or a monitor, or a small or medium-size display device, such as a cellular phone, a tablet, a laptop computer, a vehicle navigation, or a game console. The display devices may be provided only for the illustrative purpose. As a person having ordinary skill in the art, the display device DD may be implemented in another form without departing from the scope of the present disclosure. The display device DD is in a shape of a rectangle having a long side in a first direction DR1 and a short side in a second direction DR2 intersecting the first direction DR1. However, the shape of the display device DD is not limited thereto, but various display devices DD having various shapes may be provided. The display device DD may display an image IM, in a third direction DR3, on a display surface IS parallel to the first direction DR1 and the second direction DR2. The display surface IS to display the image IM may correspond to a front surface of the display device DD.

According to some embodiments, a front surface (or top surface) and a rear surface (or a bottom surface) of each of members are defined based on a direction that the image IM is displayed. The front surface and the rear surface are opposite to each other in the third direction DR3, and the normal direction to the front surface and the rear surface may parallel to the third direction DR3.

The distance between the front surface and the rear surface in the third direction DR3 may correspond to the thickness of the display device DD in the third direction DR3. Meanwhile, the first direction DR1, the second direction DR2, and the third direction DR3 may be relative concepts and may be changed to different directions.

The display device DD may sense an external input applied from the outside. The external input may include various types of inputs that are provided from the outside of the display device DD. The display device DD according to some embodiments of the present disclosure may sense an external input of a user, which is applied from the outside. The external input by the user may include any one of various external inputs, such as a part of a body of the user, light, heat, a gaze, or pressure, or the combination thereof. In addition, the display device DD may sense the external input of the user, which is applied to the side surface or the rear surface of the display device DD depending on the structures of the display device DD, and is not limited to any one embodiment. For example, according to some embodiments, the external input may include an input made by an input device (e.g., a stylus pen, an active pen, a touch pen, an electronic pen, or an e-pen).

The display surface IS of the display device DD may be divided into a display region DA and a non-display region NDA. The display region DA may be a region to display the image IM. The user views the image IM through the display region DA. According to some embodiments, the display region DA is illustrated as a rectangular shape rounded in vertexes. However, the shape is provided for the illustrative purpose. For example, the display region DA may have various shapes, and is not limited to any one embodiment.

The non-display region NDA is adjacent to (e.g., in a periphery our outside a footprint of) the display region DA. The non-display region NDA may have a specific color. The non-display region NDA may surround the display region DA. Accordingly, a shape of the display region DA may be defined substantially by the non-display region NDA. However, the above shape of the display region DA is provided for the illustrative purpose. For example, the non-display region NDA may be adjacent to only one side of the display region DA or may be omitted. According to some embodiments of the present disclosure, the display device DD may include various embodiments, and not limited to any one embodiment.

As illustrated in FIG. 2, the display device DD may include a display module DM and a window WM located on the display module DM. The display module DM includes a display panel DP and an input sensing layer ISP.

According to some embodiments of the present disclosure, the display panel DP may be a light emitting display panel. For example, the display panel DP may be an organic light emitting display panel, an inorganic light emitting display panel, or a quantum dot light emitting display panel. A light emitting layer of the organic light emitting display panel may include an organic light emitting material. A light emitting layer of the inorganic light emitting display panel may include an inorganic light emitting material. A light emitting layer of the quantum dot light emitting display panel may include a quantum dot and a quantum rod.

The display panel DP may output the image IM, and the image IM, which is output, may be displayed through the display surface IS.

The input sensing layer ISP may be located on the display panel DP to sense an external input. The input sensing layer ISP may be directly located on the display panel DP. According to some embodiments of the present disclosure, the input sensing layer ISP may be formed on the display panel DP through a subsequent process. In other words, when the input sensing layer ISP is directly located on the display panel DP, an inner adhesive film is not interposed between the input sensing layer ISP and the display panel DP. However, the inner adhesive film may be interposed between the input sensing layer ISP and the display panel DP. In this case, the input sensing layer ISP and the display panel DP are not fabricated through the subsequent processes. In other words, after fabricating the input sensing layer ISP through a process separate from that of the display panel DP, the input sensing layer ISP may be fixed on a top surface of the display panel DP through the inner adhesive film.

The window WM may include a transparent material to output the image IM. For example, the window WM may include glass, sapphire, or plastic. Although the window WM is illustrated in a single layer, embodiments according to the present disclosure are not limited thereto. For example, the window WM may include a plurality of layers.

Meanwhile, according to some embodiments, the non-display region NDA of the display device DD may be actually provided by printing one region of the window WM with a material including a specific color. According to some embodiments of the present disclosure, the window WM may include a light shielding pattern for defining the non-display region NDA. The light shielding pattern, which has the form of an organic film having a color, may be, for example, formed in a coating manner.

The window WM may be coupled to the display module DM through an adhesive film. According to some embodiments of the present disclosure, the adhesive film may include an optically clear adhesive film (OCA). However, the adhesive film is not limited thereto, but may include a typical adhesive agent and adhesion agent. For example, the adhesive film may include an optically clear resin (OCR) or a pressure sensitive adhesive (PSA) film.

An anti-reflective layer may be further interposed between the window WM and the display module DM. The anti-reflective layer decreases reflectivity of an external light incident from above the window WM. According to some embodiments of the present disclosure, the anti-reflective layer may include a phase retarder and a polarizer. The retarder may be a retarder of a film type or a liquid crystal coating type and may include a θ/2 retarder and/or a θ/4 retarder. The polarizer may also have a film type or a liquid crystal coating type. The film type polarizer may include a stretched synthetic resin film, and the liquid crystal coating type polarizer may include liquid crystals aligned in a specific array. The retarder and the polarizer may be implemented with one polarization film.

According to some embodiments of the present disclosure, the anti-reflective layer may include color filters. The arrangement of the color filters may be determined based on colors of light generated from a plurality of pixels PX (see FIG. 4) included in the display panel DP. In this case, the anti-reflective layer may further include a light shielding pattern interposed between color filters.

The display module DM may display the image IM, and may transmit/receive information on an external input, in response to an electrical signal. The display module DM may be defined with a display region DAA and a non-display region NAA. The display region DAA may be a region defined to output (to display the image IM) from the display panel DP. In addition, the display region DAA may be defined as a region in which the input sensing layer ISP senses the external input applied from the outside. According to some embodiments, the display region DAA of the display module DM may correspond to at least a portion of the display region DA.

The non-display region NAA is adjacent to the display region DAA. The non-display region NAA may not be a region for actually displaying the image IM. For example, the non-display region NAA may surround the display region DAA. However, the above form is provided for the illustrative purpose. For example, the non-display region NAA may have various forms, and not limited to any one embodiment. According to some embodiments, the non-display region NAA of the display module DM may correspond to at least a portion of the non-display region NDA.

The display device DD may include a plurality of flexible films FF connected to the display panel DP. A driving chip DIC may be mounted on each flexible film FF. According to some embodiments of the present disclosure, a data driver 200 (see FIG. 4) may include a plurality of driving chips DIC, and the plurality of driving chips DIC may be mounted on the plurality of flexible films FF, respectively.

The display device DD may further include at least one printed circuit board PCB coupled to the plurality of flexible films FF. According to some embodiments of the present disclosure, although two printed circuit boards PCB are provided in the display device DD, the number of printed circuit boards PCB is not limited thereto. Two adjacent printed circuit boards PCB of the printed circuit boards PCB may be electrically connected to each other by a connection film CF. In addition, at least one of the printed circuit boards PCB may be electrically connected to a main board. A drive controller 100 (see FIG. 4) and a voltage generator 300 (see FIG. 4) may be located on at least one of the printed circuit boards PCB.

Although FIG. 2 illustrates that the driving chips DIC are mounted on the plurality of flexible films FF, embodiments according to the present disclosure are not limited thereto. For example, the driving chips DIC may be directly mounted on the display panel DP. In this case, a part, on which the driving chip DIC is mounted, of the display panel DP may be bent and located on a rear surface of the display module DM.

The input sensing layer ISP may be electrically connected to the printed circuit board PCB through the plurality of flexible films FF. However, embodiments of the present disclosure are not limited thereto. In other words, the display module DM may further include an additional flexible film to electrically connect the input sensing layer ISP to the printed circuit board PCB.

The display device DD may further include a housing EDC to receive the display module DM. The housing EDC may be coupled to the window WM to define an outer appearance of the display device DD. The housing EDC may absorb the impact applied from the outside and prevent or reduce instances of a contaminant or a foreign substance/moisture being infiltrated into the display module DM to protect components received in the housing EDC. Meanwhile, according to some embodiments of the present disclosure, the housing EDC may be provided in the form in which the plurality of receiving members are coupled.

The display device DD according to some embodiments may further include an electronic module including various functional modules to operate the display module DM, a power supply module (e.g., a battery) to supply power necessary for overall operations of the display device DD, and a bracket coupled with the display module DM and/or the housing EDC to partition an inner space of the display device DD, etc.

Figure 3A:
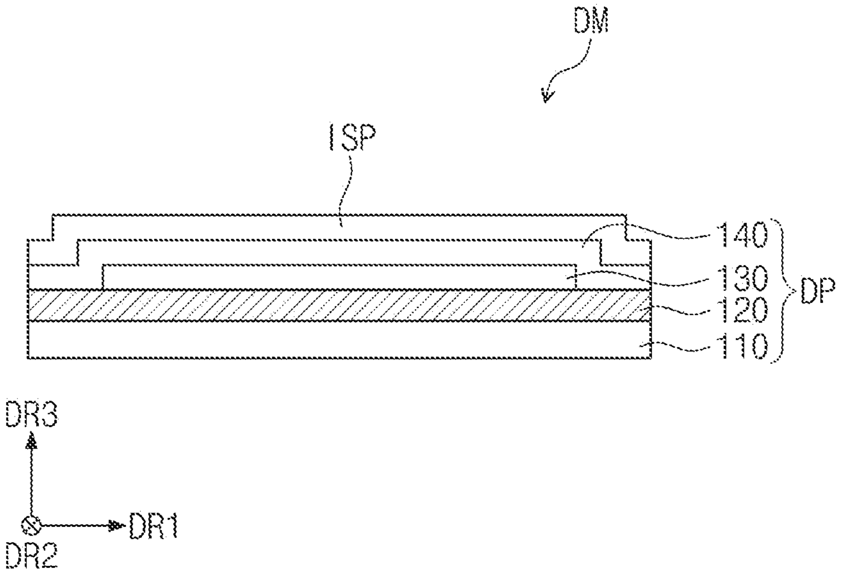
FIG. 3A is a cross-sectional view of an electronic device according to some embodiments of the present disclosure.

FIG. 3A is a cross-sectional view of an electronic device according to some embodiments of the present disclosure.

Referring to FIG. 3A, the display module DM includes the display panel DP and the input sensing layer ISP.

The display panel DP may include a base layer 110, a circuit layer 120, a light emitting element layer 130, and an encapsulation layer 140.

The base layer 110 may be a member that provides a base surface for arranging the circuit layer 120. The base layer 110 may be a glass substrate, a metal substrate, a polymer substrate, or the like. However, embodiments according to the present disclosure are not limited thereto, and the base layer 110 may be an inorganic layer, an organic layer, or a composite material layer.

The circuit layer 120 may be located on the base layer 110. The circuit layer 120 may include an insulating layer, a semiconductor pattern, a conductive pattern, a signal line, and the like. An insulating layer, a semiconductor layer, and a conductive layer may be formed on the base layer 110 by a coating or deposition process, and the insulating layer, the semiconductor layer, and the conductive layer may then be selectively patterned through a plurality of photolithography processes. Afterwards, the semiconductor pattern, the conductive pattern, and the signal line included in the circuit layer 120 may be formed.

The light emitting element layer 130 may be located on the circuit layer 120. The light emitting element layer 130 may include a light emitting element. For example, the light emitting element layer 130 may include an organic light emitting material, an inorganic light emitting material, an organic-inorganic light emitting material, a quantum dot, a quantum rod, a micro-LED, or a nano-LED.

The encapsulation layer 140 may be located on the light emitting element layer 130. The encapsulation layer 140 may protect the light emitting element layer 130 from foreign substances such as moisture, oxygen, and dust particles.

The input sensing layer ISP may be located on the display panel DP. The input sensing layer ISP may detect an external input applied from the outside. The external input may be an input of a user. The user input may include various types of external inputs such as a part of a body of the user, a light, a heat, a pen, or a pressure.

The input sensing layer ISP may be formed on the display panel DP through sequential processes. In this case, it may be expressed that the input sensing layer ISP is directly located on the display panel DP. The expression "being directly located" may mean that the third component is not interposed between the input sensing layer ISP and the display panel DP. In other words, a separate adhesive member may not be interposed between the input sensing layer ISP and the display panel DP. Alternatively, the input sensing layer ISP may be coupled to the display panel DP through an adhesive member. The adhesive member may include a typical adhesive or an adhesion agent.

Figure 3B:
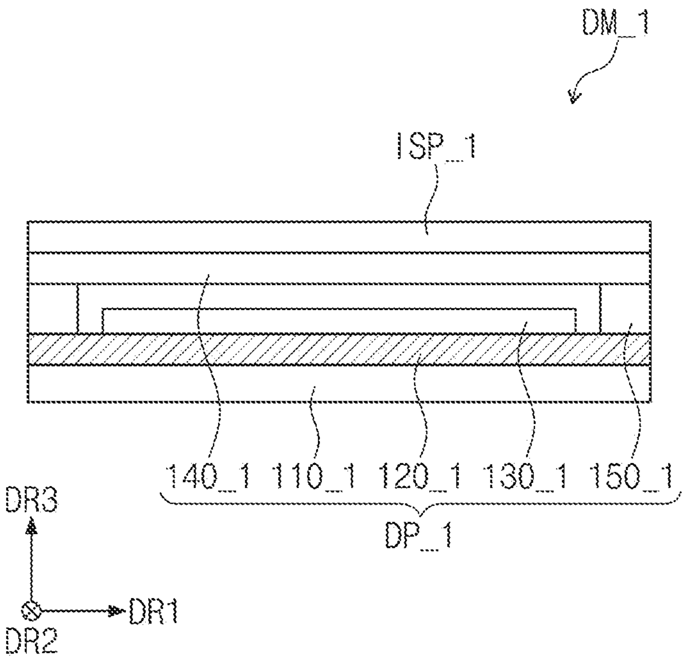
FIG. 3B is a cross-sectional view of an electronic device according to some embodiments of the present disclosure.

FIG. 3B is a cross-sectional view of an electronic device according to some embodiments of the present disclosure.

Referring to FIG. 3B, a display module DM_1 may include a display panel DP_1 and an input sensing layer ISP_1. The display panel DP_1 may include a base substrate 110_1, a circuit layer 120_1, a light emitting element layer 130_1, an encapsulation substrate 140_1, and a coupling member 150_1.

Each of the base substrate 110_1 and the encapsulation substrate 140_1 may include a glass substrate, a metal substrate, or a polymer substrate, but is not specifically limited thereto.

The coupling member 150_1 may be interposed between the base substrate 110_1 and the encapsulation substrate 140_1. The coupling member 150_1 may 150_1 may couple the encapsulation substrate 140_1 to the base substrate 110_1 or the circuit layer 120_1. The coupling member 150_1 may include an inorganic material or an organic material. For example, the inorganic material may include a frit seal, and the organic material may include a photo-curable resin or a photo-plastic resin. However, a material constituting the coupling member 150_1 is not limited to the above example.

The input sensing layer ISP_1 may be directly located on the encapsulation substrate 140_1. In this case, "directly located" may mean that a third component is not interposed between the input sensing layer ISP_1 and the encapsulation substrate 140_1. In other words, a separate adhesive member may not be located between the input sensing layer ISP_1 and the display panel DP_1. However, embodiments according to the present disclosure are not limited thereto. For example, an adhesive layer may be further interposed between the input sensing layer ISP_1 and the encapsulation substrate 140_1.

Figure 4:
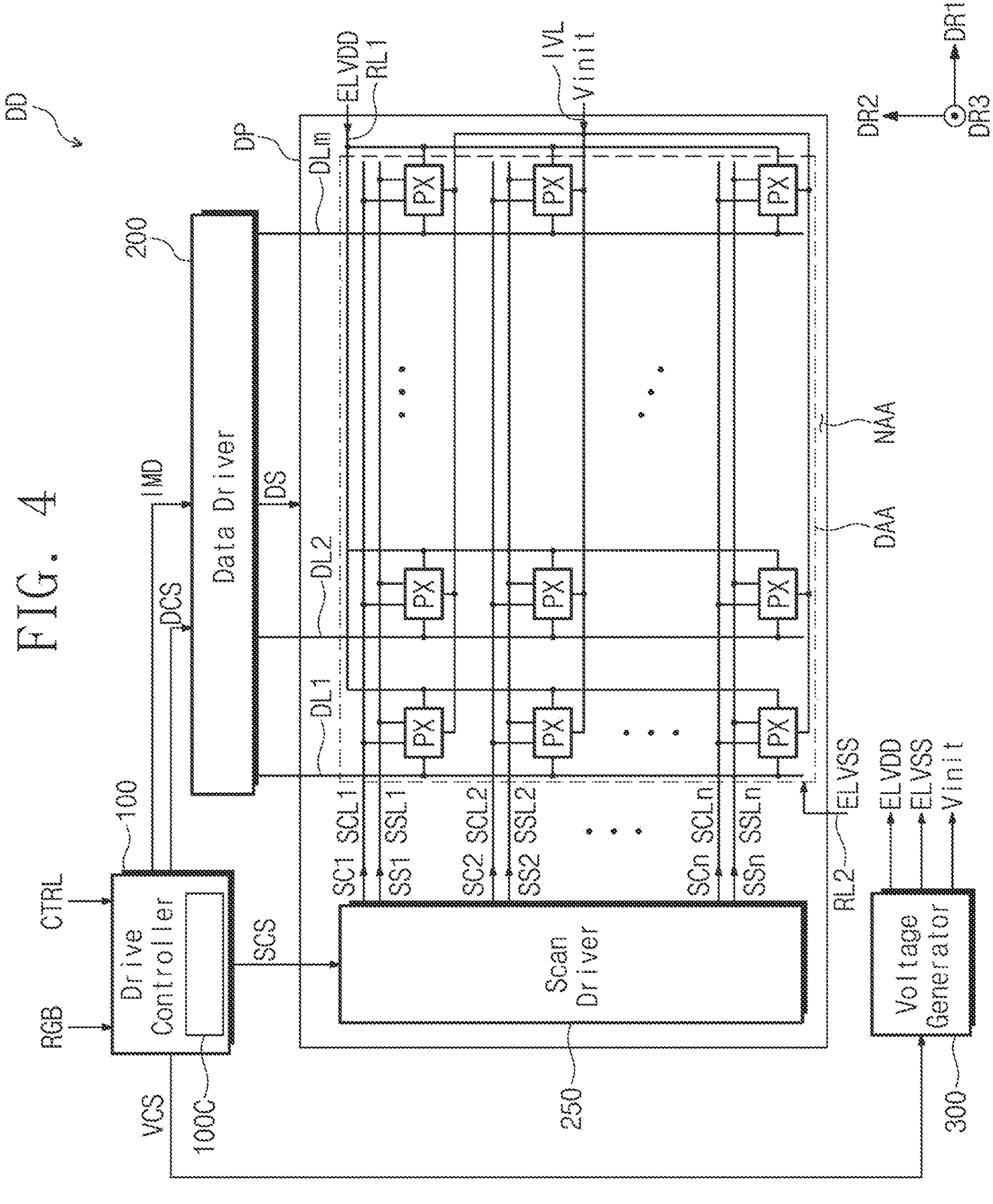
FIG. 4 is a block diagram of a display device according to some embodiments of the present disclosure.

FIG. 4 is a block diagram of a display device according to some embodiments of the present disclosure.

Referring to FIG. 4, the display device DD includes a drive controller 100, the data driver 200, a scan driver 250, the voltage generator 300, and the display panel DP.

The drive controller 100 may receive an image signal RGB and a control signal CTRL from a main controller (e.g., a micro-controller). The drive controller 100 generates image data IMD by transforming a data format of the image signal RGB to be matched to the interface specification of the data driver 200.

The drive controller 100 may generate a scan control signal SCS, a data control signal DCS, and a voltage control signal VCS, based on the control signal CTRL.

The drive controller 100 may include a heat emitting control unit 100C. The heat emitting control unit 100C may determine a heat emission state of a plurality of pixels PX, which is made due to the image IM (see FIG. 1) displayed on the display region DAA. The details thereof will be described later.

According to some embodiments of the present disclosure, the drive controller 100 may compensate for the image data IMD based on the heat emission state determined by the heat emitting control unit 100C. Even if the transistor included in each of the plurality of pixels is deteriorated by the heat, the drive controller 100 may compensate for the image quality of the display panel DP using the image data IMD compensated based on the heat emission state. Accordingly, the display device DD improved in display quality may be provided.

The data driver 200 receives the data control signal DCS and the image data IMD from the drive controller 100. The data driver 200 may convert the image data IMD into data signals DS, and may output the data signals DS to a plurality of data lines DL1, and DL2 to DLm (m is a natural number greater than '1'). The data signals DS may be analog voltages corresponding to a gray level value of the image data IMD. The data driver 200 may be located inside the driving chips DIC illustrated in FIG. 2.

The display panel DP may be electrically connected to the drive controller 100, the data driver 200, and the voltage generator 300. According to some embodiments of the present disclosure, the display panel DP may be an emissive-type display panel, and embodiments according to the present disclosure are not limited thereto. For example, the display panel DP may be an organic light emitting display panel, a quantum dot display panel, a micro-light emitting diode (LED) display panel, or a nano-LED display panel. The display panel DP may include the scan driver 250, and the plurality of pixels PX.

The scan driver 250 receives the scan control signal SCS from the drive controller 100. The scan driver 250 may output first scan signals SC1, and SC2, to SCn to a plurality of first scan lines SCL1, and SCL2 to SCLn ('n' is a natural number greater than '1'), and may output second scan signals SS1, and SS2 to SSn to a plurality of second scan lines SSL1, and SSL2 to SSLn.

The display panel DP may include the plurality of first scan lines SCL1, and SCL2 to SCLn, a plurality of second scan lines SSL1, and SSL2 to SSLn, a plurality of data lines DL1, and DL2 to DLm, and a plurality of pixels PX. The display panel DP may be divided into the display region DAA and the non-display region NAA. The plurality of pixels PX may be located in the display region DAA, and the scan driver 250 may be located in the non-display region NAA.

The plurality of first scan lines SCL1, and SCL2 to SCLn and the plurality of second scan lines SSL1, and SSL2 to SSLn may extend to be parallel to each other in the first direction DR1. The plurality of first scan lines SCL1, and SCL2 to SCLn and the plurality of second scan lines SSL1, and SSL2 to SSLn may be arranged to be spaced apart from each other in the second direction DR2.

The plurality of data lines DL1, and DL2 to DLm may extend to be parallel to each other in the second direction DR2 from the data driver 200. The plurality of data lines DL1, and DL2 to DLm may be arranged to be spaced apart from each other in the first direction DR1.

The plurality of pixels PX may be electrically connected to the first scan lines SCL1, and SCL2 to SCLn, the second scan lines SSL1, and SSL2 to SSLn, and the data lines DL1, and DL2 to DLm, respectively. For example, pixels in the first row may be connected to the scan lines SCL1 and SSL1, and pixels in the second row may be connected to the scan lines SCL2 and SSL2.

According to some embodiments, the scan driver 250 may be located at the first side of the display panel DP. The scan driver 250 may be adjacent to the first side of the display region DAA, but embodiments according to the present disclosure are not limited thereto. For example, the scan driver 250 may be located adjacent to the first side and the second side of the display region DAA. For example, the scan driver 250 may be adjacent to the first side of the display region DAA may apply the first scan signals SC1, and SC2 to SCn to the first scan lines SCL1, and SCL2 to SCLn. The scan driver 250 may be adjacent to the second side of the display region DAA may apply the second scan signals SS1, and SS2 to SSn to the second scan lines SSL1, and SSL2 to SSLn.

Each of the plurality of pixels PX may receive a first driving voltage (or driving voltage) ELVDD, a second driving voltage ELVSS, and an initialization voltage VINT.

The voltage generator 300 may receive the voltage control signal VCS from the drive controller 100. The voltage generator 300 may generate voltages necessary for an operation of the display panel DP. According to some embodiments of the present disclosure, the voltage generator 300 may generate the first driving voltage ELVDD, the second driving voltage ELVSS, and the initialization voltage VINT necessary for the operation of the display panel DP.

The first driving voltage ELVDD may be provided to the display panel DP through a first voltage line RL1 (or the driving voltage line). The second driving voltage ELVSS may be provided to the display panel DP through a second voltage line RL2. The initialization voltage VINT may be provided to the display panel DP through a third voltage line IVL.

The voltage generator 300 may further generate various voltages (e.g., a gamma reference voltage, a data driving voltage, a gate-on voltage, and a gate-off voltage), in addition to the first driving voltage ELVDD, the second driving voltage ELVSS, and the initialization voltage VINT.

Figure 5:
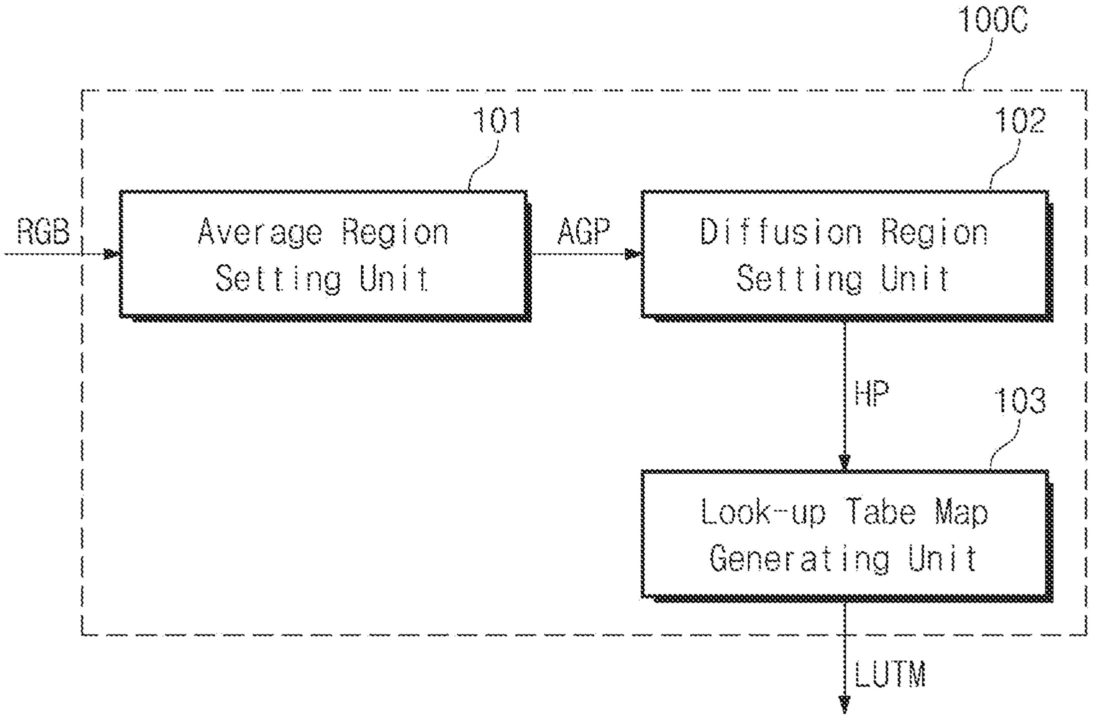
FIG. 5 is a block diagram of a drive controller according to some embodiments of the present disclosure.
Figure 6:
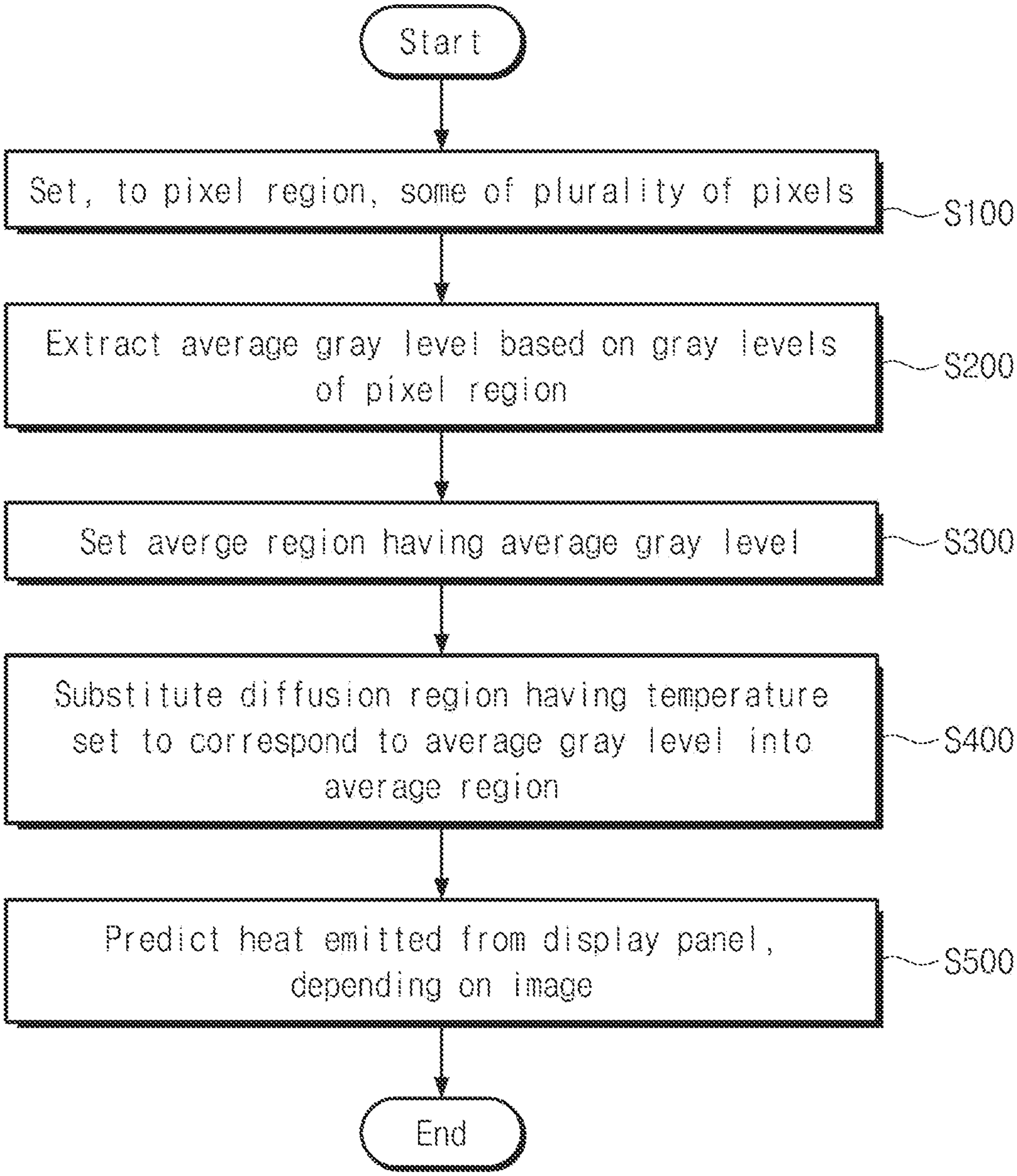
FIG. 6 is a flowchart illustrating a method of driving a display device according to some embodiments of the present disclosure.

FIG. 5 is a block diagram of a drive controller according to some embodiments of the present disclosure and FIG. 6 is a flowchart illustrating a method of driving a display device according to some embodiments of the present disclosure.

Referring to FIGS. 4, 5, and 6, the heat emitting control unit 100C may determine a heat emission state of the plurality of pixels PX, which is made due to the image IM (see FIG. 1) displayed on the display region DAA.

The heat emitting control unit 100C may include an average region setting unit 101, a diffusion region setting unit 102, and a look-up table map generating unit 103.

The average region setting unit 101 may receive the image signal RGB. The image signal RGB may include a gray level provided from each of the plurality of pixels PX to display the image IM (see FIG. 1).

The average region setting unit 101 may set some pixels of the plurality of pixels PX to one pixel region AA (see FIG. 8) (S100).

The average region setting unit 101 may extract an BB (X Gray, see FIG. 9), based on the gray level of each of some of the plurality of pixels PX (S200).

The average region setting unit 101 may set one average region BB (see FIG. 9) based on the pixel region AA (see FIG. 8) (S300).

The average region setting unit 101 may set a plurality of average regions BB (see FIG. 9) by performing the above operation with respect to the whole pixels PX. The average region setting unit 101 may convert a display pattern of the image IM (see FIG. 1) into the plurality of average regions BB (see FIG. 9).

Figure 9:
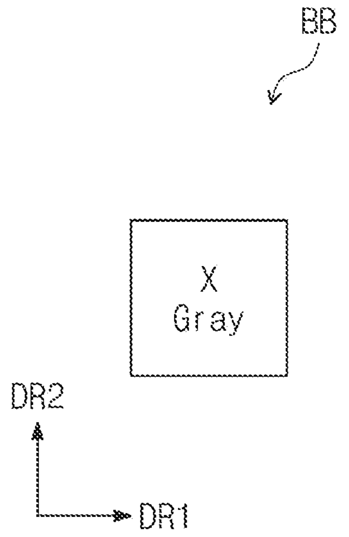
FIG. 9 is a view illustrating one average region according to some embodiments of the present disclosure.

The average region setting unit 101 may output a gray image AGP including the plurality of average regions BB (see FIG. 9). For example, the gray image AGP may have an arrangement of the plurality of average regions BB (see FIG. 9). For example, the gray image AGP may be provided with a grayscale image of the image IM (see FIG. 1), which includes the plurality of average regions BB arranged in the form of a mosaic (see FIG. 9).

The diffusion region setting unit 102 may receive the gray image AGP from the average region setting unit 101.

The diffusion region setting unit 102 may substitute a diffusion region HDA (see FIG. 10) having a temperature set to correspond to the average gray level (X Gray, see FIG. 9) into an average region BB (see FIG. 9) (S400). A plurality of diffusion regions HDA (see FIG. 10) may be provided. For example, the plurality of diffusion regions HDA (see FIG. 10) may be provided in number corresponding to the number of the plurality of average regions BB (see FIG. 9).

The diffusion region setting unit 102 may output the gray image AGP and a heating image HP including a plurality of diffusion regions HAD (see FIG. 10) substituted in the gray image AGP.

The look-up table map generating unit 103 may receive the heating image HP from the diffusion region setting unit 102.

Figure 10:
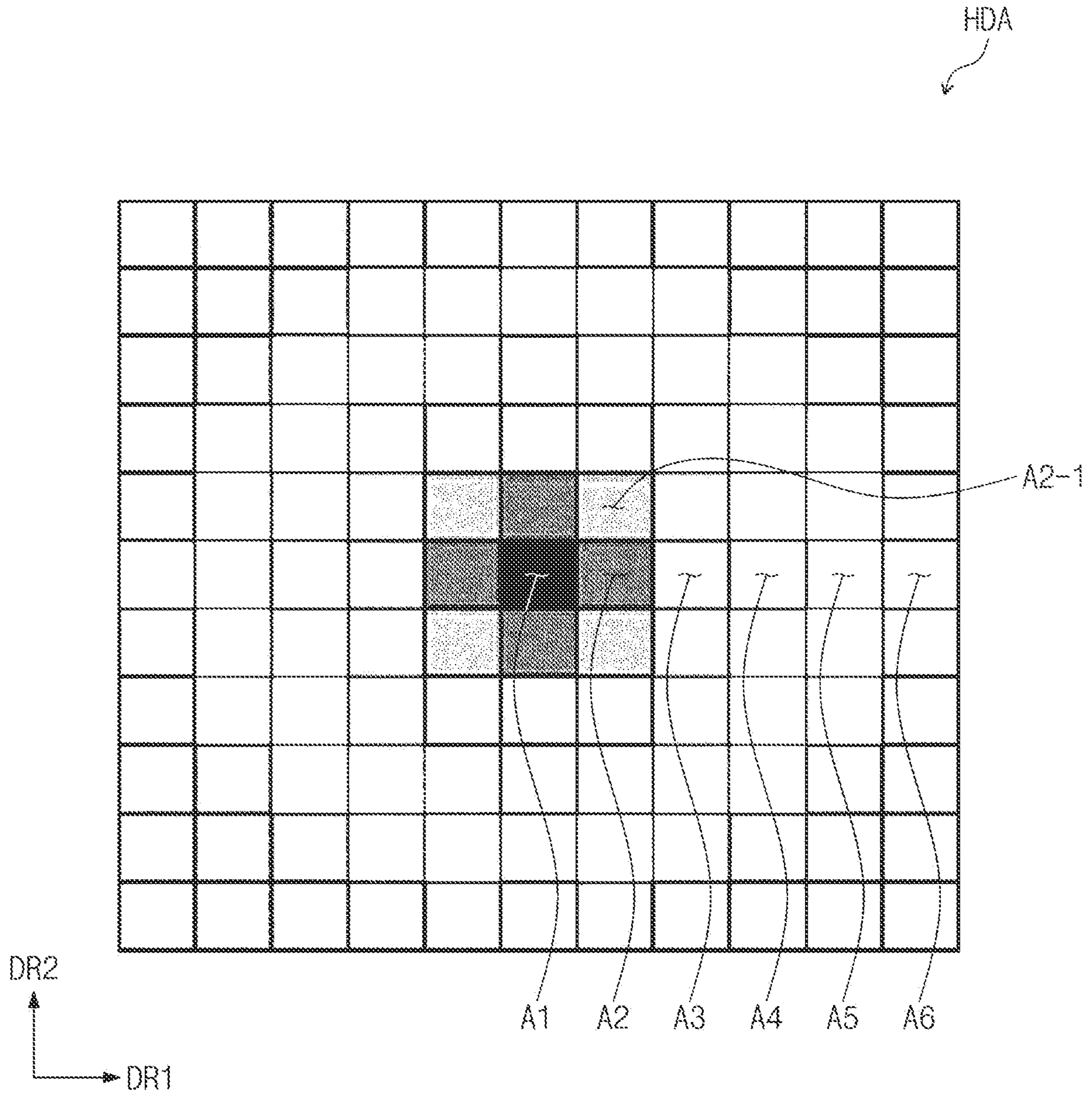
FIG. 10 is a view illustrating one diffusion region according to some embodiments of the present disclosure.

The look-up table map generating unit 103 may generate a look-up table map LUTM by predicting (S500) heat emitted from the inside of the display region DAA of the display panel DP, depending on the image IM (see FIG. 1), based on the diffusion region HAD (FIG. 10). The look-up table map generating unit 103 may output the look-up table map LUTM.

A temperature value corresponding to each of the plurality of average regions BB (see FIG. 9) may be stored in the look-up table map LUTM.

The drive controller 100 may compensate each of the plurality of pixels PX using the look-up table map LUTM.

In the case of a specific region having a relatively higher gray level in an image IM (see FIG. 1), the temperature may be relatively higher than that of other adjacent regions. In this case, the pixels PX located in the specific region may be deteriorated by heat. However, according to some embodiments of the present disclosure, the look-up table map LUTM may store the temperature value predicted using the image signal RGB for each region. The drive controller 100 may compensate for the image data IMD based on the look-up table map LUTM. Even if the transistor contained in each of the plurality of pixels PX is deteriorated by heat, the drive controller 100 may compensate for the image quality of the display panel DP by using the image data IMD compensated based on the heat emission state at each position. Accordingly, the display device DD may be provided with the improved display quality.

Figure 7:
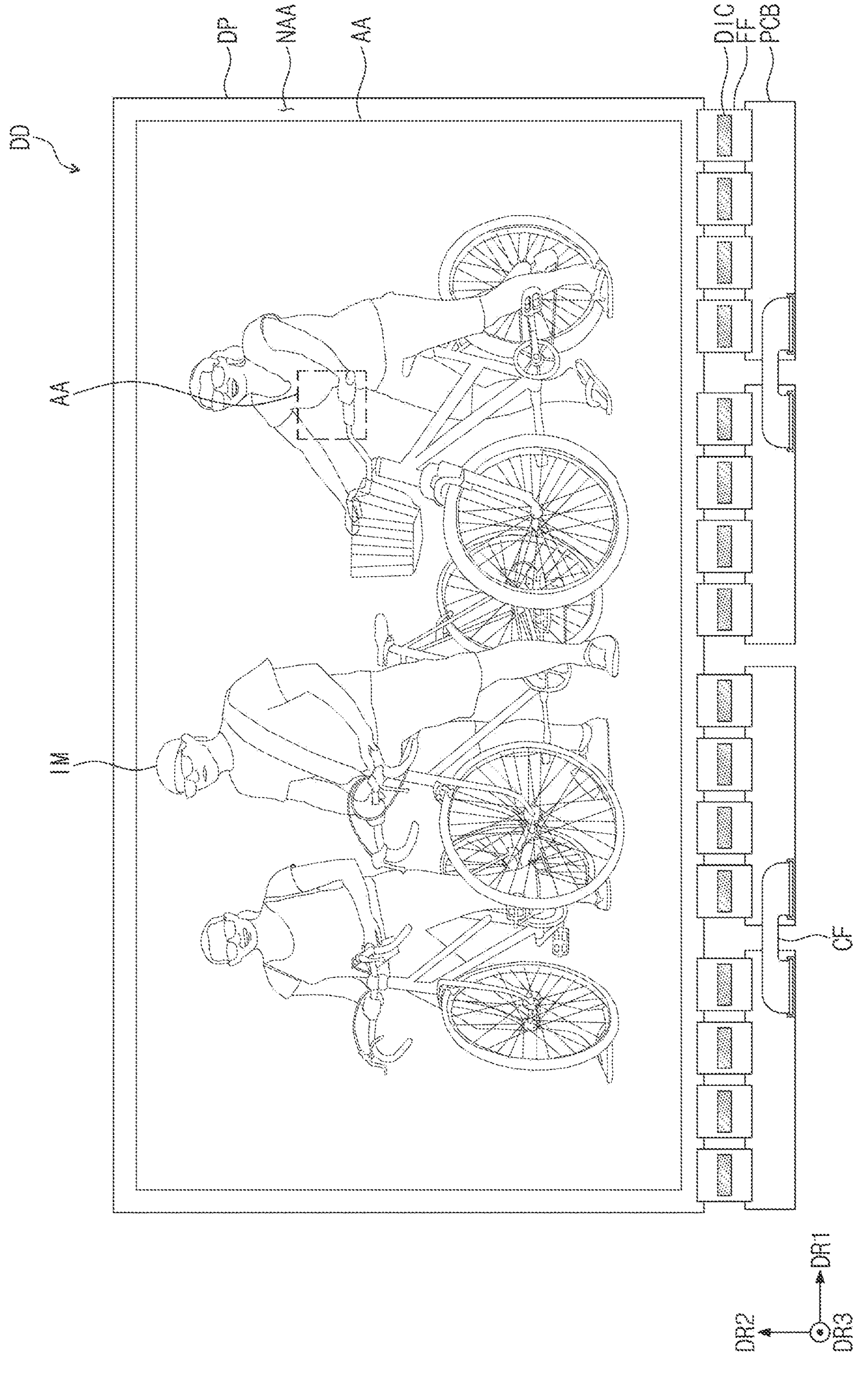
FIG. 7 is a view illustrating an image displayed on a display panel according to some embodiments of the present disclosure.

FIG. 7 is a view illustrating an image displayed on a display panel according to some embodiments of the present disclosure. In the following description made with reference to FIG. 7, the components, which have been described with reference to FIGS. 1 and 2, will be assigned with the same reference numerals, and the details thereof will be omitted.

FIG. 7 illustrates the form in which four printed circuit boards PCB are provided to the display device DD, which is different from that of FIG. 2.

Referring to FIGS. 5 and 7, the image IM may be displayed on the display panel DP during one display frame. The heat emitting control unit 100C may receive the image signal RGB and output the look-up table map LUTM. The heat emitting control unit 100C may predict the heat emission state depending on the image IM, based on the look-up table map LUTM.

The average region setting unit 101 may receive the image signal RGB including information on the image IM.

The average region setting unit 101 may set the specific number of pixels PX, for the pixel region AA.

A plurality of pixel regions AA may be provided, and the average region setting unit 101 may group the plurality of pixels PX into the specific number of groups to be set for the plurality of pixel regions AA. Accordingly, the image IM may be expressed through the plurality of pixel regions AA.

Figure 8:
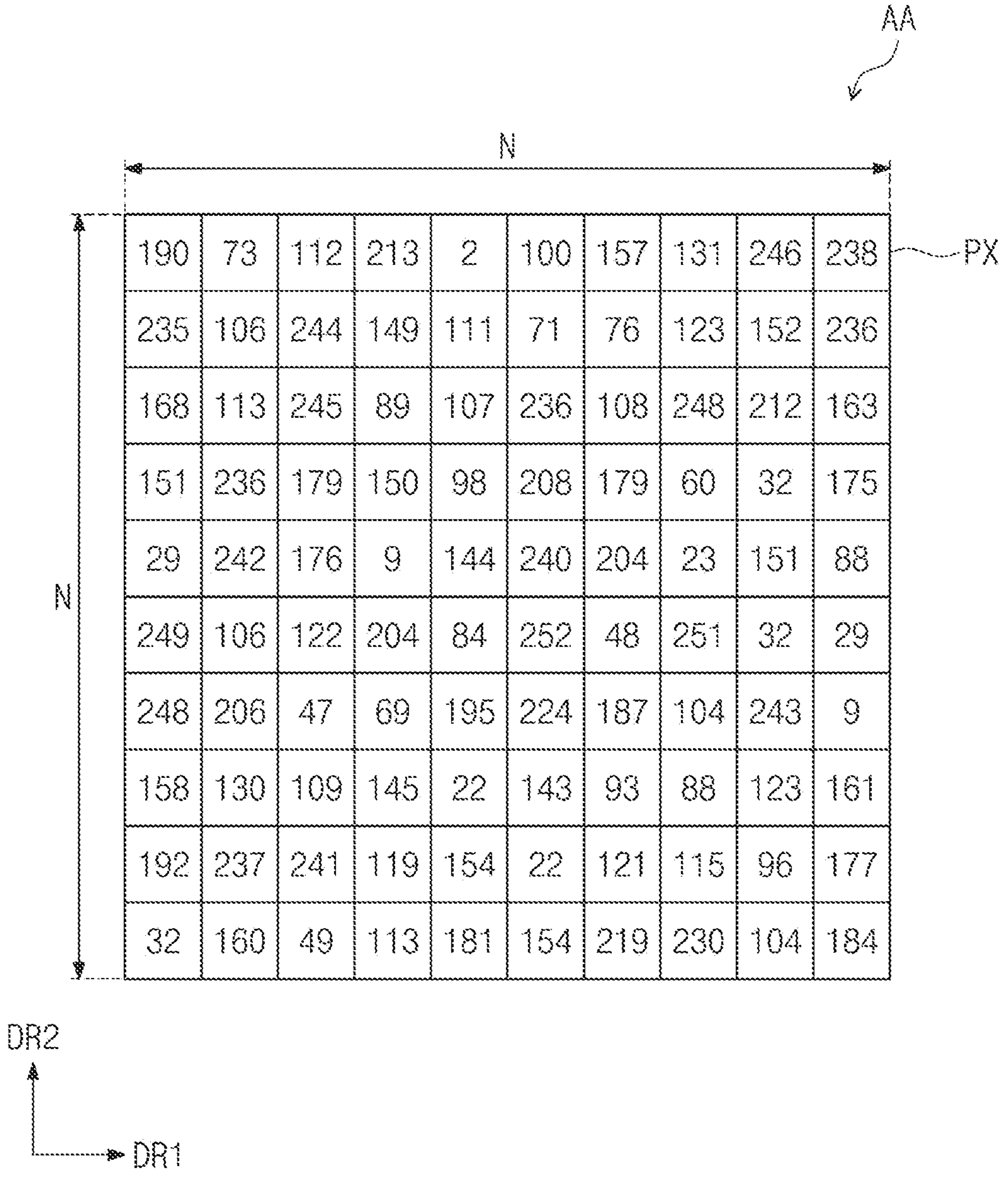
FIG. 8 is a view illustrating one pixel region according to some embodiments of the present disclosure.

FIG. 8 illustrates a pixel region according to some embodiments of the present disclosure.

Referring to FIGS. 5 and 8, the average region setting unit 101 may receive the image signal RGB. The image signal RGB may include a gray level provided in each of the plurality of pixels PX to display the image IM.

The numeric value illustrated in each pixel PX shows, by way of example, a gray level provided to each of the plurality of pixels PX through the image signal RGB. Each of the plurality of pixels PX may have a gray level depending on the image signal RGB. The gray level may have one value among 0 to 255.

The average region setting unit 101 may set some pixels of the plurality of pixels PX for one pixel region AA. The pixel region AA may be defined as a minimum region in which heat is saturated. The size of the pixel region AA may be defined as an appropriate size through actual measurement.

According to some embodiments of the present disclosure, the average region setting unit 101 may calculate a heat emitting characteristic by designating a region having saturated heat, as the pixel region AA and setting the region as one average region BB (see FIG. 9). The load applied to a computing operation of the heat emitting control unit 100C may be reduced. Accordingly, the computing speed of the heat emitting control unit 100C may be improved. Accordingly, the drive controller 100 (see FIG. 4), the display device DD (see FIG. 4), and the method of driving the display device may be provided.

The pixel region AA may have the shape of a square having N pixels PX in each of the first direction DR1 and the second direction DR2. FIG. 8 illustrates that N has a numeric value of 10, and one pixel region AA includes 100 pixels PX. However, this is provided only for illustrative purpose, and the number of pixels PX included in one pixel region AA according to some embodiments of the present disclosure is not limited thereto and may be variously provided. For example, N may be a natural number.

FIG. 9 illustrates an average region according to some embodiments of the present disclosure.

Referring to FIGS. 5, 8, and 9, the average region setting unit 101 may extract an average gray level (X Gray) based on gray levels of the plurality of pixels PX included in the pixel region AA. The average gray level (X Gray) may be an average value of gray levels of the plurality of pixels PX. The average gray level (X Gray) may have one value between 0 and 255. For example, the average gray level (X Gray) extracted using the pixel region AA illustrated in FIG. 8 may have a value of 144.

The average region setting unit 101 may set one average region BB from the pixel region AA. The size of one average region BB may be the same as the size of one pixel region AA. For example, the average region BB converted from the pixel region AA illustrated in FIG. 8 may have a square shape having the size of N pixels PX in each of the first direction DR1 and the second direction DR2.

The average region BB may have an average gray level (X Gray). In other words, the pixel region AA including the plurality of pixels PX may be defined as the average region BB having the average gray level (X Gray).

A plurality of pixel regions AA and a plurality of average regions BB may be provided, and the average region setting unit 101 may group the plurality of pixels PX into the specific number of groups to be set for the plurality of pixel regions AA. The average region setting unit 101 may convert the plurality of pixel regions AA into the plurality of average regions BB, respectively.

The average region setting unit 101 may output the gray image AGP including the plurality of average regions BB. The average region setting unit 101 may output a display pattern of the image IM as the gray image AGP by dividing the display pattern of the image IM into average regions BB. For example, the gray image AGP may have the form in which the plurality of average regions BB are arranged in the first direction DR1 and the second direction DR2. The gray image AGP may be provided with a grayscale image of the image IM, which includes the plurality of average regions BB arranged in the form of a mosaic.

FIG. 10 illustrates a diffusion region according to some embodiments of the present disclosure.

Referring to FIGS. 5, 9, and 10, the diffusion region setting unit 102 may receive the gray image AGP from the average region setting unit 101.

The diffusion region setting unit 102 may define the diffusion region HDA. The diffusion region HDA may be larger in size than the average region BB. The diffusion region HDA may include a plurality of blocks A1, A2, A3, A4, A5, A6, and A2-1.

The plurality of blocks A1, A2, A3, A4, A5, A6, and A2-1 may include the first block A1, the second block A2 spaced in the first direction DR1 from the first block A1, the third block A3 spaced apart in the first direction DR1 from the second block A2, the fourth block A4 spaced apart in the first direction DR1 from the third block A3, the fifth block A5 spaced apart in the first direction DR1 from the fourth block A4, the sixth block A6 spaced apart in the first direction DR1 from the fifth block A5, and the seventh block A2-1 spaced apart in the second direction DR2 from the second block A2. FIG. 10 illustrates that the diffusion region HDA includes 121 blocks. However, this is provided only for the illustrative purpose, and the number of a plurality of blocks included in the diffusion region HDA according to some embodiments of the present disclosure is not limited thereto.

The diffusion region HDA may be a visual illustration of heat which is emitted due to an average gray level (X gray) of one average region BB and diffused in the first direction DR1 and the second direction DR2.

The plurality of blocks A1, A2, A3, A4, A5, A6, and A2-1 may have different temperature values depending on colors.

A temperature value corresponding to the average gray level (X gray) may be set for the first block A1. In other words, a temperature value corresponding to each of the values of 0 to 255 of the average gray level (X gray) may be set for the first block A1 of the diffusion region HDA. For example, when the average gray level (X gray) illustrated in FIG. 9 is 144, the first block A1 may be defined as a temperature value of +5° C.

The remaining blocks A2, A3, A4, A5, A6, and A2-1 may have temperature values lowered farther away in the first direction DR1 and/or the second direction DR2 from the first block A1 which is a central block of the remaining blocks A2, A3, A4, A5, A6, and A2-1. In other words, the temperature value of the first block A1 located at the center may be higher, and the temperature value of the sixth block A6 spaced apart from the center may be lower. For example, the second block A2 may be defined as a temperature value of +4.7° C. The third block A3 may be defined as a temperature value of +4.4° C. The fourth block A4 may be defined as a temperature value of +4.1° C. The fifth block A5 may be defined as a temperature value of +3.8° C. The sixth block A6 may be defined as a temperature value of +3.5° C. The seventh block A2-1 may be defined as a temperature value of +4.5° C.

The sizes of each of the plurality of blocks A1, A2, A3, A4, A5, A6, and A2-1 may be equal to the size of the average region BB. In other words, the temperature value defined in the first block A1 may be a temperature value predicted to be applied to the average region BB. The temperature value defined in the second block A2 may be a temperature value predicted to be applied to another average region BB adjacent to the average region BB in the first direction DR1. The temperature value defined in the seventh block A2-1 may be a temperature value predicted to be applied to another average region BB adjacent to the average region BB in the first direction DR1 and the second direction DR2.

According to some embodiments of the present disclosure, a temperature value may be set for each of the plurality of blocks A1, A2, A3, A4, A5, A6, and A2-1 in the diffusion region HDA while considering that heat emitted from one of the plurality of pixels PX (see FIG. 4) is diffused to other adjacent pixels PX (see FIG. 4). The heat emitting control unit 100C may easily predict a heat emitting characteristics of the display region DAA (see FIG. 7) using the diffusion region HDA. Accordingly, the drive controller 100 (see FIG. 4), the display device DD (see FIG. 4), and the method of driving the display device may be provided.

The plurality of diffusion regions HDA may be provided. The diffusion region setting unit 102 may substitute the plurality of diffusion regions HDA having a temperature value set to correspond to the average gray X Gray into the plurality of average regions BB included in the gray image AGP, respectively. The plurality of diffusion regions HDA may be provided in number corresponding to the number of the plurality of average regions BB.

The diffusion region setting unit 102 may output the heating image HP including the gray image AGP and the plurality of diffusion regions HDA.

Figure 11:
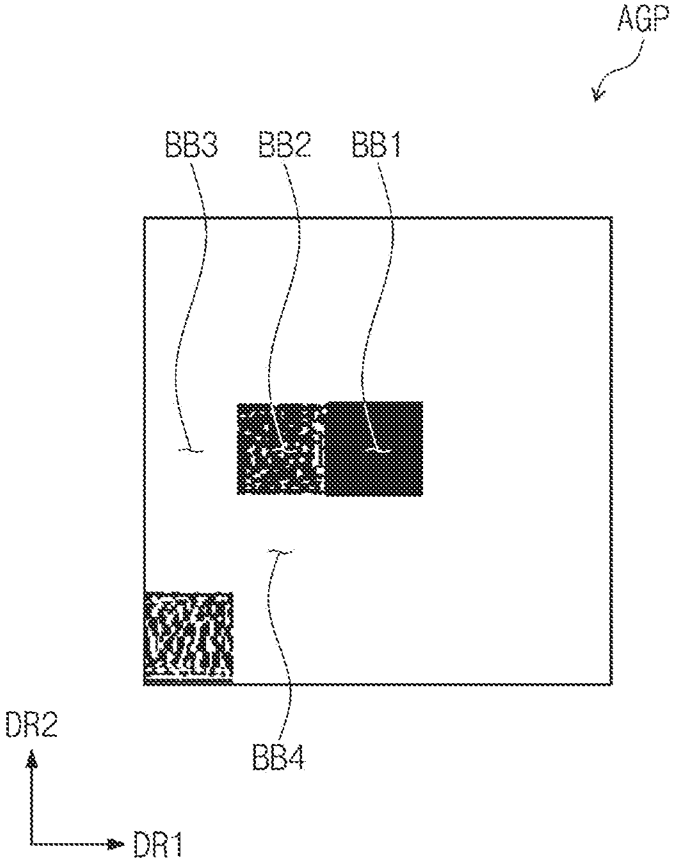
FIG. 11 illustrates a portion of a gray image according to some embodiments of the present disclosure.

FIG. 11 illustrates a portion of a gray image according to some embodiments of the present disclosure.

FIG. 11 illustrates a portion of the gray image included in the heating image.

Referring to FIGS. 5, 9, and 10, the look-up table map generating unit 103 may receive the heating image HP from the diffusion region setting unit 102.

The heating image HP may include the gray image AGP and the plurality of diffusion regions HDA. The gray image AGP may include a plurality of average regions BB1, BB2, BB3, and BB4.

The plurality of diffusion regions HDA may be applied to the plurality of average regions BB1, BB2, BB3, and BB4, respectively. The plurality of average regions BB1, BB2, BB3, and BB4 may include the first average region BB1, the second average region BB2, the third average region BB3, and the fourth average region BB4. The plurality of diffusion regions HDA may include first to fourth diffusion regions.

A first diffusion region, which corresponds to the average gray level (X gray) of the first average region BB1, of the plurality of diffusion regions HDA may be applied to the first average region BB1. The diffusion region setting unit 102 may set the first block A1, which is a region located at the center of the first diffusion region, to be overlapped with the first average region BB1.

A second diffusion region, which corresponds to the average gray level (X gray) of the second average region BB2, of the plurality of diffusion regions HDA may be applied to the second average region BB2. The diffusion region setting unit 102 may set the first block A1, which is a region located in the center of the second diffusion region, to be overlapped with the second average region BB2.

A third diffusion region, which corresponds to the average gray level (X gray) of the third average region BB3, of the plurality of diffusion regions HDA may be applied to the third average region BB3. The diffusion region setting unit 102 may set the first block A1, which is a region located at the center of the third diffusion region, to be overlapped with the third average region BB3.

A fourth diffusion region, which corresponds to the average gray level (X gray) of the fourth average region BB4, of the plurality of diffusion regions HDA may be applied to the fourth average region BB4. The diffusion region setting unit 102 may set the first block A1, which is a region located at the center of the fourth diffusion region, to be overlapped with the fourth average region BB4.

The look-up table map generating unit 103 may generate a look-up table map LUTM by predicting heat emitted from the inner part of the display region DAA (see FIG. 7) of the display panel DP (see FIG. 7) depending on the image IM (see FIG. 7), based on the plurality of diffusion regions HDA.

A temperature value corresponding to each of the plurality of average regions BB (see FIG. 9) may be stored in the look-up table map LUTM. The look-up table map generating unit 103 may store the temperature value in the look-up table map LUTM by adding values of regions, which are overlapped with each other, of diffusion regions applied to the plurality of average regions BB1, BB2, BB3, and BB4, respectively.

Regarding the first average region BB1, the first block A1 of the first diffusion region, the second block A2 of the second diffusion region, the third block A3 of the third diffusion region, and the seventh block A2-1 of the fourth diffusion region may be overlapped with a region corresponding to the first average region BB1 of the look-up table map LUTM.

Accordingly, the temperature value stored in the region corresponding to the first average region BB1 of the look-up table map LUTM may be the sum of the first temperature value set for the first block A1 of the first diffusion region, the second temperature value stored in the second block A2 of the second diffusion region, the third temperature value stored in the third diffusion region A3, and the fourth temperature value stored in the seventh block A2-1 of the fourth diffusion region.

Although a manner of calculating a temperature value stored in the first average region BB1 has been described, the manner may be identically applied to each of the remaining average regions BB2, BB3, and BB4 to calculate the temperature value of each of the remaining average regions BB2, BB3, and BB4.

In addition, although FIG. 11 illustrates the first to fourth average regions BB1, BB2, BB3, and BB4 of the plurality of average regions included in the gray image AGP, the above manner may be identically applied to the remaining average regions to calculate temperature values of the remaining average regions.

According to some embodiments of the present disclosure, the look-up table map generating unit 103 may output the look-up table map LUTM. In other words, the heat emitting control unit 100C may predict heat emitted due to the image IM (see FIG. 7) in real time, based on the image signal RGB and output a predicted value to look-up table map LUTM. The heat emitted from the display region DAA (see FIG. 7) due to the image IM (see FIG. 7) may be easily predicted through the temperature values of the look-up table map LUTM. Accordingly, the drive controller 100 (see FIG. 4), the display device DD (see FIG. 4), and the method of driving the display device may be provided to predict a heat emission characteristic.

The drive controller 100 (see FIG. 4) may compensate for each of a plurality of pixels PX (see FIG. 4) using the look-up table map LUTM.

As described above, the look-up table map generating unit may output a look-up table map. In other words, the heat emitting control unit may predict heat emitted due to the image in real time, based on the image signal, and output a prediction result to the look-up table map. The heat emitted from the display region depending on the image may be easily predicted through the temperature values of the look-up table map. Embodiments of the present disclosure may provide a drive controller, a display device, and a method for driving a display device, capable of predicting a heat emitting characteristic.

In addition, as described above, the temperature value, which is predicted based on the image signal, for each region may be stored in the look-up table map. The drive controller may compensate for the image data, based on the look-up table map. Even if the transistor included in each of the plurality of pixels is deteriorated by the heat, the drive controller may compensate for the image quality of the display panel using image data compensated based on the heat emission state. Accordingly, the display device having the improved image quality may be provided.

Although aspects of some embodiments of the present disclosure have been described for illustrative purposes, those skilled in the art will appreciate that various modifications, and substitutions are possible, without departing from the scope and spirit of the present disclosure as disclosed in the accompanying claims. Accordingly, the technical scope of embodiments according to the present disclosure is not limited to the detailed description of this specification, but should be defined by the claims.

The electronic or electric devices and/or any other relevant devices or components or units according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments according to the present invention.

While aspects of the present disclosure have been described with reference to some embodiments thereof, it will be apparent to those of ordinary skill in the art that various changes and modifications may be made thereto without departing from the spirit and scope of embodiments according to the present disclosure as set forth in the following claims.

What is claimed is:

1. A display device comprising:

a display panel including a plurality of pixels and configured to display an image; and a drive controller configured to receive an image signal, and to drive the plurality of pixels, and including a heat emitting controller, wherein the heat emitting controller includes:

an average region setter configured to receive the image signal, to set, to one pixel region, some pixels of the plurality of pixels, and to extract an average gray level, based on gray levels of the some pixels of the plurality of pixels to set an average region from the pixel region;

a diffusion region setter configured to substitute a diffusion region, which is set to have a temperature corresponding to the average gray level, into the average region; and a look-up table map generator configured to generate a look-up table map by predicting, based on the diffusion region, heat emitted from an inner part of a display region of the display panel and varied depending on the image.

2. The display device of claim 1, wherein the average gray level is an average value of the gray levels of the some pixels of the plurality of pixels.

3. The display device of claim 1, wherein the pixel region has a shape of a square having N pixels (N is a natural number) in a first direction and a second direction crossing the first direction.

4. The display device of claim 1, wherein the diffusion region is larger in size than the average region.

5. The display device of claim 1, wherein the diffusion region setter is configured to set a region, at the center of the diffusion region, to be overlapped with the average region.

6. The display device of claim 1, wherein the diffusion region is set to have a value lowered farther away from a central region.

7. The display device of claim 1, wherein the average region includes a plurality of average regions, and wherein the average region setter is configured to convert the image into the plurality of average regions and to provide a conversion result to the diffusion region setter.

8. The display device of claim 7, wherein the diffusion region includes a plurality of diffusion regions, and wherein the plurality of diffusion regions are applied to the plurality of average regions, respectively.

9. The display device of claim 8, wherein the look-up table map has a temperature value corresponding to each of the plurality of average regions, and wherein the look-up table map generator is configured to store the temperature value by adding values of regions, which are overlapped with each other, of diffusion regions applied to average regions, which are adjacent to each other, of the plurality of average regions.

10. A drive controller for driving a plurality of pixels, the drive controller comprising:

a heat emitting controller, wherein the heat emitting controller includes:

an average region setter configured to receive an image signal, to set, to one pixel region, some pixels of the plurality of pixels, and to extract an average gray level, based on gray levels of the some pixels of the plurality of pixels to set an average region from the pixel region;

a diffusion region setter configured to substitute a diffusion region, which is set to have a temperature corresponding to the average gray level, into the average region; and a look-up table map generator configured to generate a look-up table map by predicting heat emitted from each of the plurality of pixels and varied depending on the image signal.

11. The drive controller of claim 10, wherein the average region includes a plurality of average regions, and wherein the average region setter is configured to convert the image into the plurality of average regions and to provide a conversion result to the diffusion region setter.

12. The drive controller of claim 11, wherein the diffusion region includes a plurality of diffusion regions, and wherein the plurality of diffusion regions are applied to the plurality of average regions, respectively.

13. The drive controller of claim 12, wherein the look-up table map has a temperature value corresponding to each of the plurality of average regions, and wherein the look-up table map generator is configured to store the temperature value by adding values of regions, which are overlapped with each other, of diffusion regions applied to average regions, which are adjacent to each other, of the plurality of average regions.

14. The drive controller of claim 10, wherein the average gray level is an average value of the gray levels of the some pixels of the plurality of pixels.

15. A method for driving a display device, the method comprising:

providing an image signal to a drive controller to drive a display panel including a plurality of pixels;

setting, to one pixel region, some pixels of the plurality of pixels;

extracting an average gray level, based on gray levels of the some pixels of the plurality of pixels to set an average region from the pixel region;

substituting a diffusion region set to have a temperature corresponding to the average gray level into the average region; and generating a look-up table map by predicting heat which is emitted from each of the plurality of pixels and varied depending on the image signal.

16. The method of claim 15, wherein the plurality of pixels display an image based on the image signal, wherein the average region includes a plurality of average regions, and wherein the setting of the average region includes:

converting the image into the plurality of average regions.

17. The method of claim 16, wherein the diffusion region includes a plurality of diffusion regions, and wherein the substituting of the diffusion region into the average region includes:

applying the plurality of diffusion regions to the plurality of average regions, respectively.

18. The method of claim 17, wherein the look-up table map has a temperature value corresponding to each of the plurality of average regions, and wherein the generating of the look-up table map includes:

storing the temperature value by adding values of regions, which are overlapped with each other, of diffusion regions applied to average regions, which are adjacent to each other, of the plurality of average regions.

19. The method of claim 15, further comprising:

compensating for each of the plurality of pixels, after generating the look-up table map.

20. An electronic device comprising:

a display device comprising:

a display panel including a plurality of pixels and configured to display an image; and a drive controller configured to receive an image signal, and to drive the plurality of pixels, and including a heat emitting controller, wherein the heat emitting controller includes:

an average region setter configured to receive the image signal, to set, to one pixel region, some pixels of the plurality of pixels, and to extract an average gray level, based on gray levels of the some pixels of the plurality of pixels to set an average region from the pixel region;

a diffusion region setter configured to substitute a diffusion region, which is set to have a temperature corresponding to the average gray level, into the average region; and a look-up table map generator configured to generate a look-up table map by predicting, based on the diffusion region, heat emitted from an inner part of a display region of the display panel and varied depending on the image.

* * * * *